United States Patent [19]
Moseley

[11] Patent Number: 5,193,114
[45] Date of Patent: Mar. 9, 1993

[54] CONSUMER ORIENTED SMART CARD SYSTEM AND AUTHENTICATION TECHNIQUES

[76] Inventor: Donald R. Moseley, 197 Johnson Ave., Meriden, Conn. 06450

[21] Appl. No.: 742,314

[22] Filed: Aug. 8, 1991

[51] Int. Cl.$^5$ .............................................. H04L 9/00
[52] U.S. Cl. ...................................... 380/23; 380/25; 380/46; 380/49; 340/825.31; 340/825.34
[58] Field of Search ................. 380/23, 25, 28, 46, 380/47, 49; 340/825.31, 825.34

[56] References Cited

U.S. PATENT DOCUMENTS

| | | | |
|---|---|---|---|
| 4,455,588 | 6/1984 | Mochida et al. | 340/825.31 |
| 4,471,216 | 9/1984 | Herve | 380/25 |
| 4,499,462 | 2/1985 | Stoesser et al. | 340/825.31 |
| 4,649,233 | 2/1987 | Bass et al. | 380/21 |
| 4,779,224 | 10/1988 | Moseley et al. | 380/25 |
| 4,805,222 | 2/1989 | Young et al. | 382/2 |
| 4,916,738 | 4/1990 | Chandra et al. | 380/25 |
| 4,926,480 | 5/1990 | Chaum | 380/23 |
| 5,056,140 | 10/1991 | Kimbell | 380/23 |

*Primary Examiner*—Salvatore Cangialosi

[57] ABSTRACT

A consumer oriented secure smart card with various accounts which are accessible only through proper use of security measures. Security measures consist of encryption with described automatic key generation and management technique and a technique to authenticate the individual presenting the card.

The encryption key generation and management technique involves having a secret constant or several secret constants programmed into the card and reader, having a secret mathematical function (algorithm) programmed into the card and reader and having both units generate a group of random characters or bits which are used locally and transmitted to the counterpart unit to generate a set of session encryption keys. The random bits and the constants undergo the algorithm in order to produce a unique transmit and receive key for each session.

The method of authenticating an individual as authorized to present the card involves the individual's entering a password or personal identification number and having the equipment measure the time of each key depression, the time from release of one key to depression of the next, comparing these measurements and other derivative measurements to previously stored counterparts in order to determine if sufficient positive correlation exists to authenticate the presentor.

8 Claims, 13 Drawing Sheets

Fig. 10B

CONSUMER ORIENTED SMART CARD SYSTEM AND AUTHENTICATION TECHNIQUES

FIELD OF INVENTION

This invention relates to machine identification of other machines and individual persons specifically, electronic confirmation that a piece of electronic equipment such as a computer terminal or a "smart card" and its operator or presentor are authorized to operate as part of a specific system.

CROSS-REFERENCE TO RELATED PATENT

The encryption portion of the present invention is generally described in U.S. Pat. No. 4,779,224 IDENTITY VERIFICATION METHOD AND APPARATUS issued to me on Oct. 18, 1988. The present invention embodies a sophisticated implementation of the encryption key management technique, described in said patent. Specifically, the use of a constant and an algorithm (mathematical or logical function) being preprogrammed into each member of the group such that a group of randomly generated bits or characters passing between two or more members will generate a common result or working encryption key when the algorithm is performed on the random bits and the constant.

In conjunction with an encryption algorithm such as the American National Standards Institute's Data Encryption Standard (DES), the technique is used to confirm that a piece of hardware is authorized to operate as part of a system. This portion of the authentication process also enables one terminal or "smart card" to identify itself and be used with many different systems after being activated or initialized (by having that system's constant loaded into the unit's memory) on each system. Further, the resulting encryption system renders communication secure over any transmission medium such as radio, light wave or telephone network.

DESCRIPTION OF PRIOR ART

Prior art exists in three areas (1, 3 and 4 below):

1) Methods to confirm that various electrical/mechanical components are actually authorized to operate as part of a system abound.

Bass in U.S. Pat. No. 4,649,233 describes a system whereby a unit's primary key is encrypted by a random number then sent to a remote terminal for decryption. The random number in combination with other parameters is then used to generate a working encryption key. The difficulty of this approach lies in the idea of encrypting a constant (his cross-domain key) with a variable (random number) under a known algorithm (DES). The monitoring of two sessions yields sufficient information to break back to the constants. These in turn can be used to derive the random numbers in future sessions.

The present invention avoids transmitting any encrypted constant information by transmitting only unencrypted random numbers and constants which are used to point to values in secret look-up tables or as factors in computing values by secret functions, formulas or algorithms. Further, Bass makes no reference to actually authenticating the user, but said users password only.

2) The use of Personal Identification Numbers (PIN) or Passwords (through out this document the term PIN incorporates the term password) to identify individual persons to a system are well known in the art as are their shortcomings due to the possibility of being learned and used by others than the original assignee.

3) Several methods to "authenticate" the user of a system have been put forward including finger, voice and retna (eye) print readers. These seek a "biological" attribute of the authorized individual which would be difficult for a pretender to duplicate. Unfortunately the readers are expensive and the approaches have met social resistance from users and the general public.

Young and Hammon in their U.S. Pat. No. 4,805,222 dated Feb. 14, 1989 describe a method of user identification/authentication which measures the typing speed and cadence (keystroke dynamics) of the person being authenticated. The typing speed and time between keystrokes are measured over an extended period of time and a "templet" is formed which said user must match in subsequent typing sessions. While the technique is costly of time and computer memory it requires no special operation or intervention on the part of the authenticated person.

The Young and Hammon technique as other similarly described approaches, attend only to intervals between keyboard key depressions or the time interval from one key depression to the next key depression (FIG. 10A T3) and therefore miss most of the actual intelligence; the time a key is actually depressed (FIG. 10A T1) and the interval between the release of that key and depression of the following key (FIG. 10A T2). My tests show (FIG. 10B) that a very active or nervous type person "pokes" at the keys and therefore holds the key down only a short time compared to the intervening space while the more methodical or deliberate person depresses the key for a longer period compared to the intervening spaces. This measurement enables the identity of the user to be verified with only a few keystrokes such as entry of a PIN.

The idea of these measurements occurred during development of the system covered by my U.S. Pat. No. 4,779,224 mentioned earlier, but was not pursued at that time due to the difficulty of accessing individual key depressions on the myriad types of terminals, keyboards, and encoding schemes in use. It did not then occur to use a seperate keyboard or keypad (the term keypad incorporates the term keyboard throughout this document) for PIN entry to enable the measurements. Of course the terminal keyboard is still the preferred embodiment if the proper measurements can be made.

4) "Smart cards" in the past have been conceived from the issuer's point of view and have therefore suffered from a lack of flexibility and the danger of invasion of the individual's privacy. The present "smart card" was conceived from the public's point of view and concerns itself with the user's (owner's) privacy, multiple uses and point of view first. Surprisingly, the approach provides very strong security for the issuer and others who allow the card to be used on their systems as well.

OBJECTS AND ADVANTAGES OF THE PRESENT INVENTION

The present invention incorporates three seperate and distinct steps, parameter measurements, or methods to identify and authenticate a piece of equipment and a human person (user/owner) as being authorized to access a system or entity. Two of the three identification methods are claimed to advance the art and are therefore unique seperately and in combination:

1) The encryption key management technique enables customers to produce absolutely private seed keys through a split see key arrangement; the equipment manufacturer programs A first part (customer ID) of the split seed key prior to shipment to the customer and the customer programs the second part (extension) upon receiving the master initialization unit described below. Thus the customer is assured that no other customer can accidentally duplicate his key and his programming the second part assures against the possibility that a disgruntled employee of the manufacturer might try to attack his system. Further, the security of the system is enhanced by using multiple secret formulas or algorithms and secretly derived constants along with a group of random by bit (each bit in the random string has an equal chance of being a 1 or a 0) characters to generate the working encryption key.

2) The cadence of PIN entry measurement technique measures the time each key is depressed (called a "mark") and the time between release of one key and the depression of the next key (called a "space"). As tests (described later) show, the technique of measuring only the marks and spaces is 95% effective even with very rough measurement, loose comparison parameters and ignoring obvious additional measurements and comparisons which can easily be made.

The card/system architecture advances the art by enabling multiple, but securely separate accounts (FIG. 1B), addressing the owner's privacy first, allowing multiple applications (personal information, medical information, police-automobile information, multiple cash accounts (including foreign currency), credit card accounts, access to physical facilities through ID accounts, etc. and various levels of security for the accounts made possible by the encryption key management technique. Each transaction is time and date stamped, contains city and state where transaction was made and forms part of an indelible irrefutable record (each transaction is initiated and confirmed by the owner) of even small transactions and at the owner's option even petty cash transactions can be recorded.

While the application described here in is a consumer oriented "smart card", it can be readily seen that the security aspects have broad application from physical combination locks and identification of friendly units in a battlefield situation to remote computer access. Further, the encryption key management technique can stand alone for pure encryption in data and voice applications and the PIN/cadence technique can stand alone for applications such as physical entry push button or rotary combination locks.

The system provides a very high level of security for both user and system operator. It is very flexible due to its multiple encryption key capability and is easy to operate for the user as both the encryption and the cadence check portion of his PIN entry are transparent to him. The operator need only use a device or terminal that is properly equipped and enter his PIN as he normally does during computer log-on or using an automatic teller machine. Further the system is inexpensive compared to most other techniques. Most of the security is in software and requires only a keypad and a small amount of circuitry as opposed to more expensive optics.

DRAWINGS/FIGURES

The drawings are representative only. The actual items may, and probably will, show very little resemblance to the attached depictions.

Figure 5:
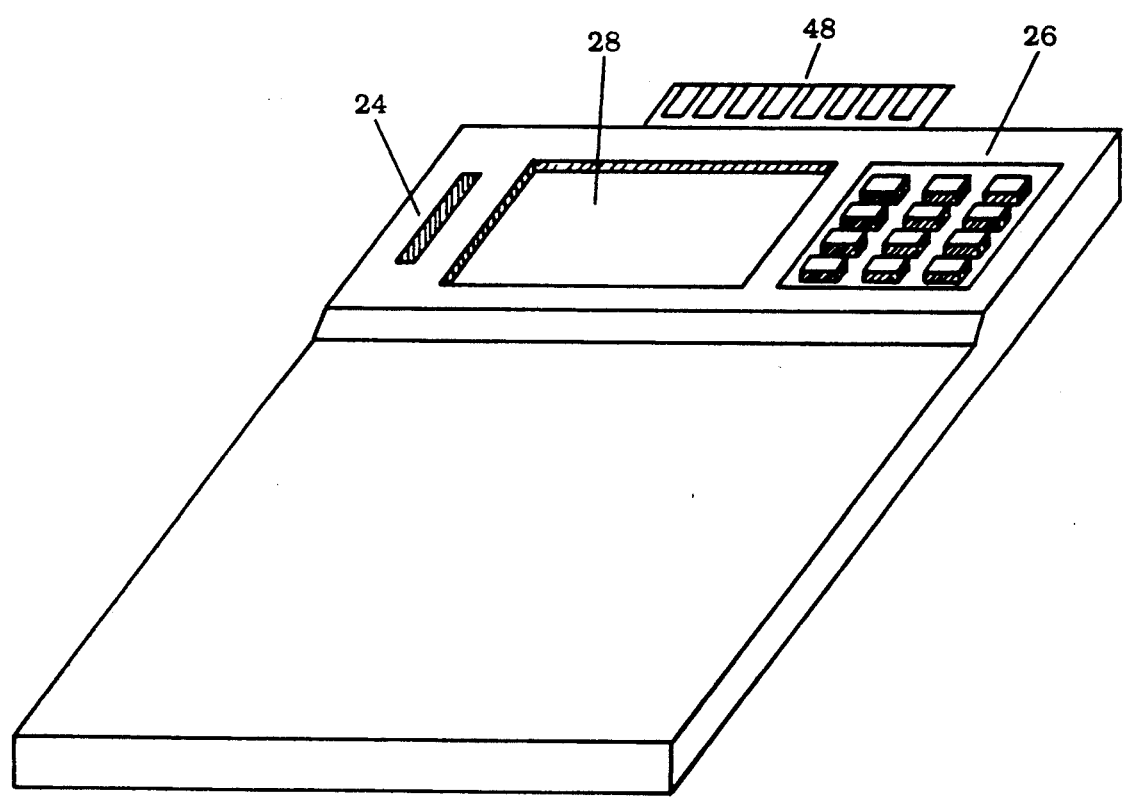
Figure 6:
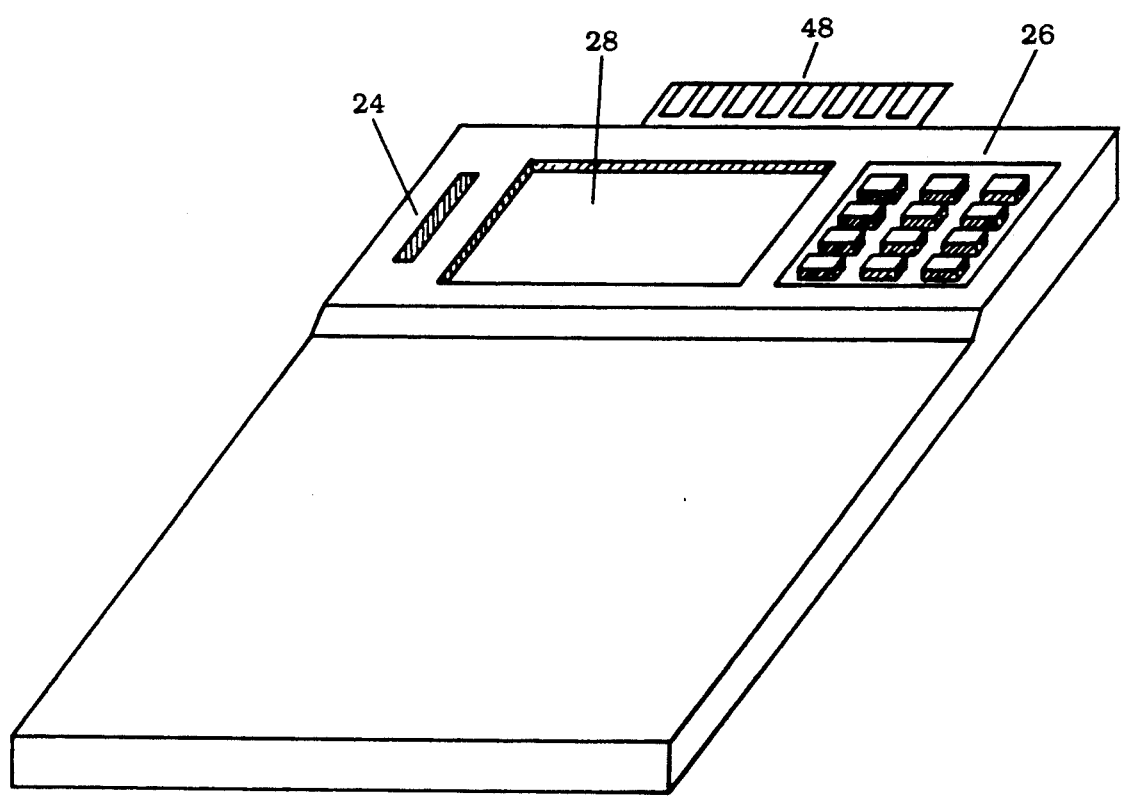

FIGS. 5&6 Restaurant Intermediate Unit and Police/Emergency medical reader.

Figure 7:
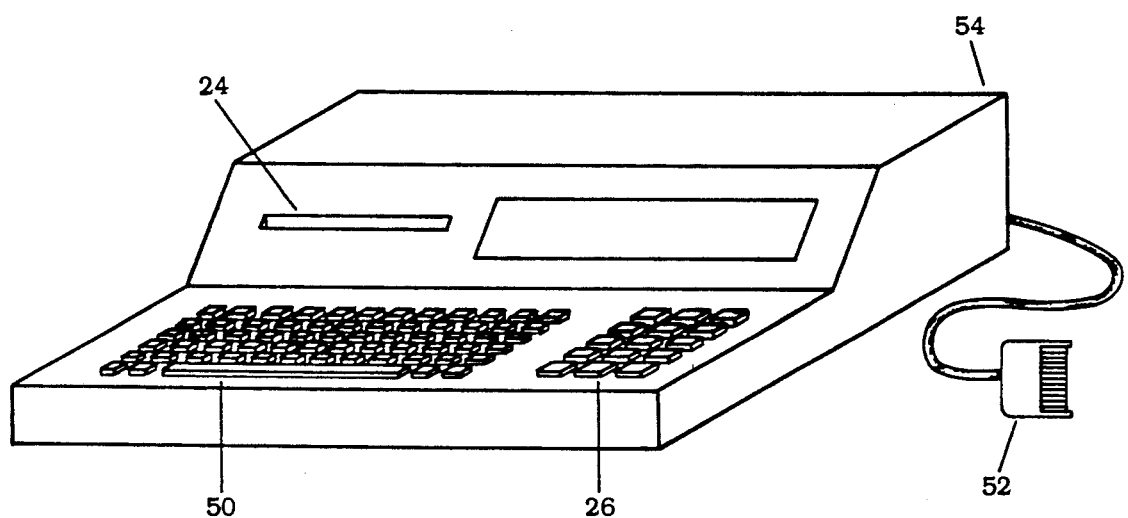

FIG. 7 Depicts the initialization units.

Figure 8:
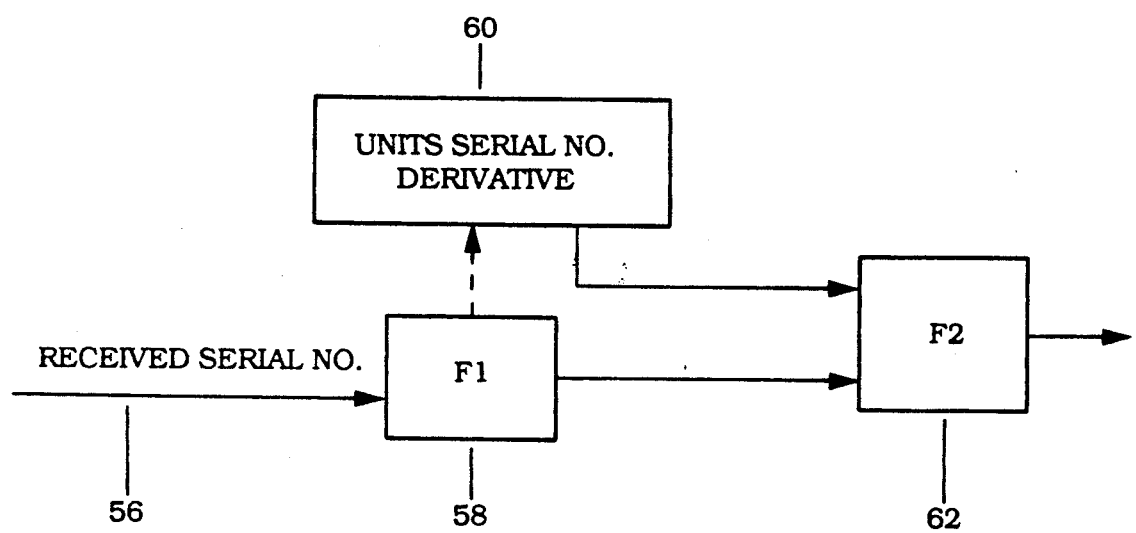

FIG. 8 Block/flow diagram of first card/reader interchange.

Figure 9:
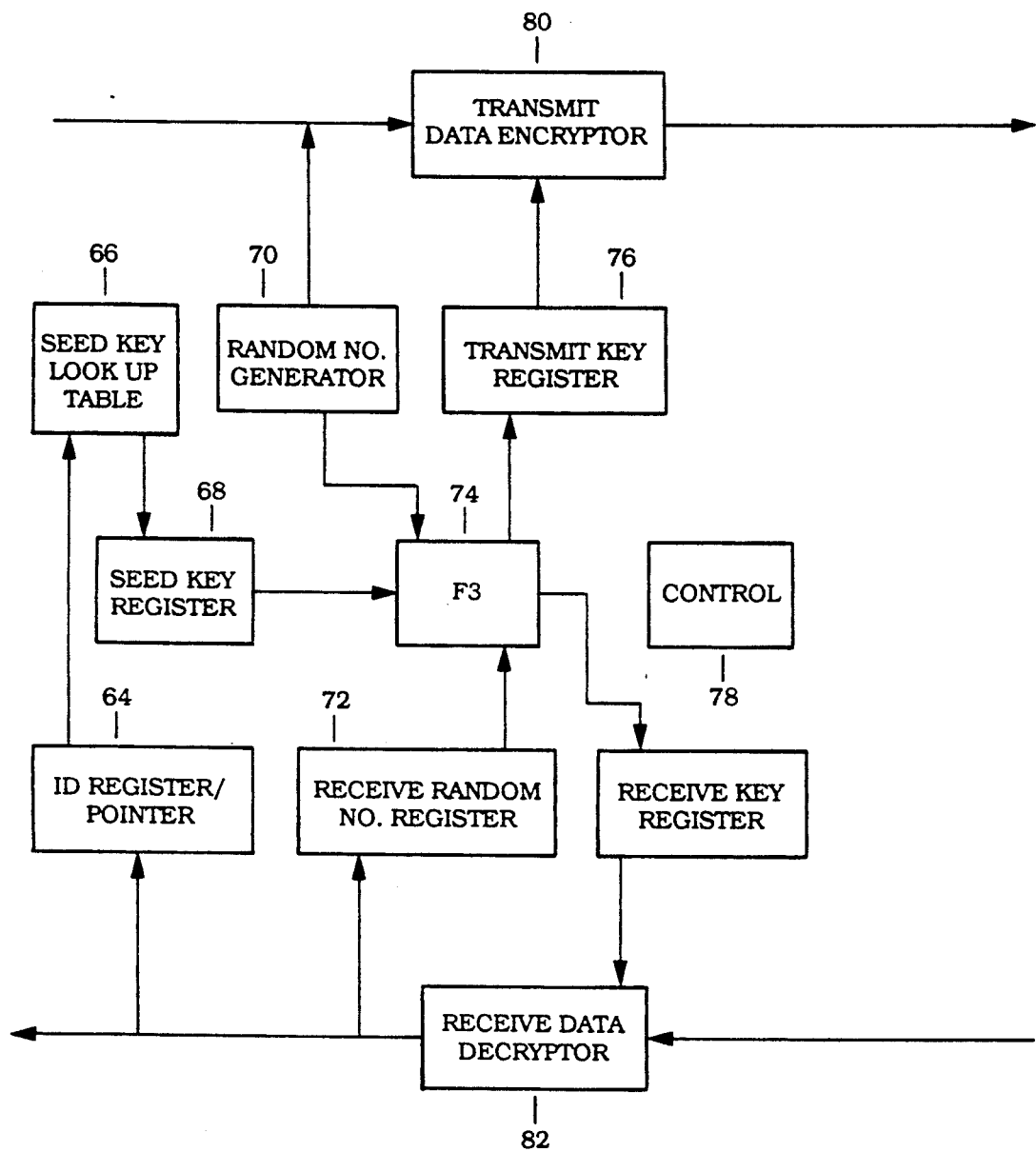

FIG. 9 Card/reader encryption interchange (second card/reader interchange).

Figure 10A:
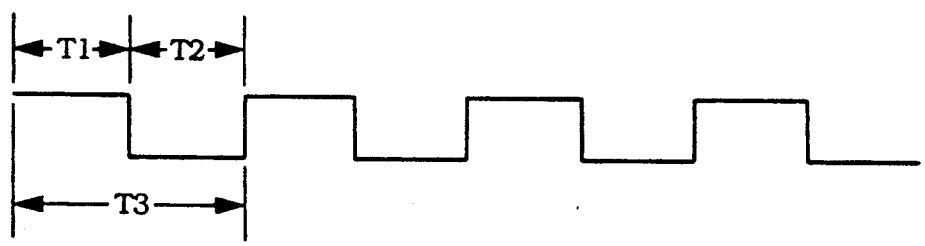

FIG. 10A Illustrates measurement periods

Figure 10B:
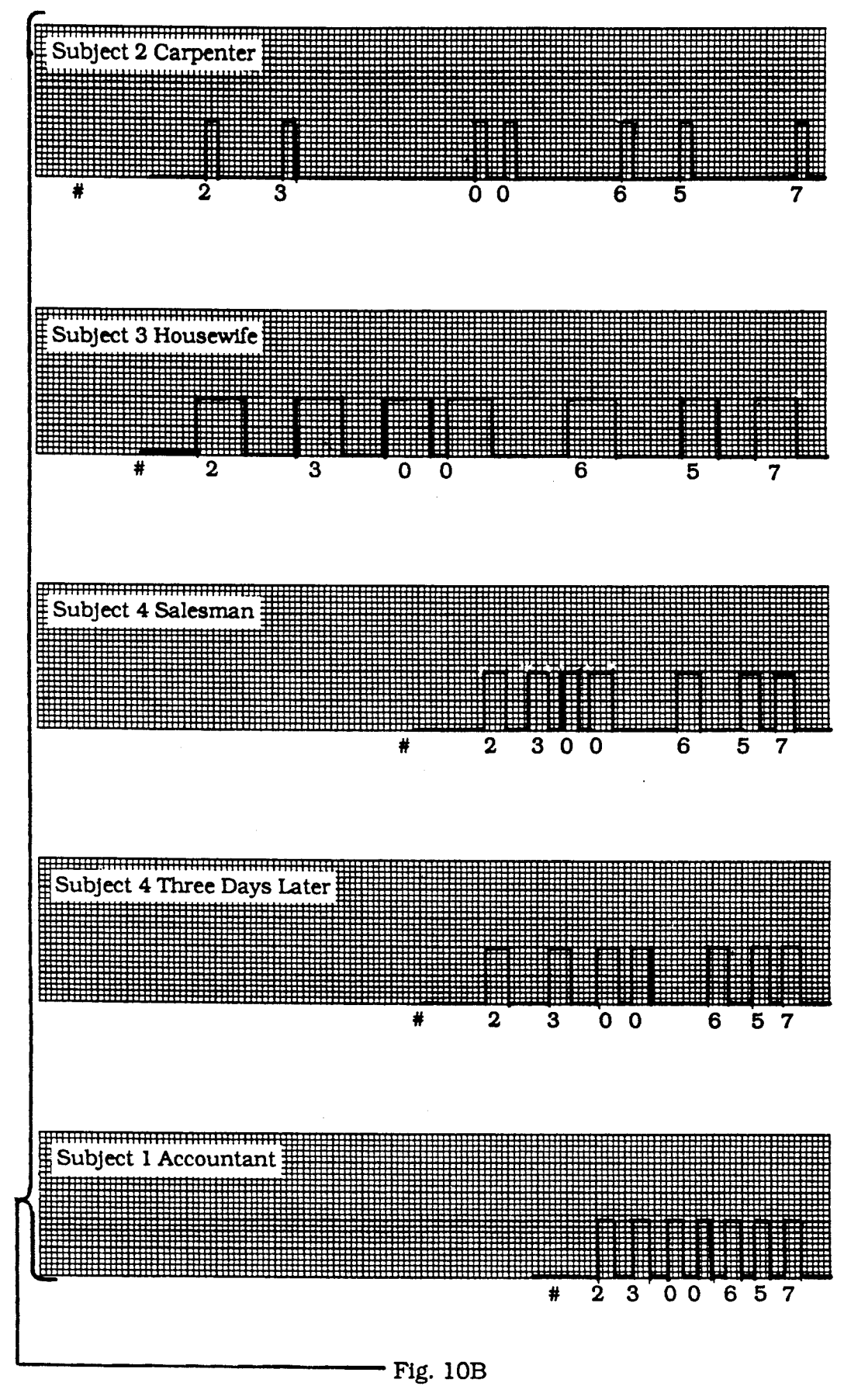

FIG. 10B Sample cadence measurements.

Figure 11:
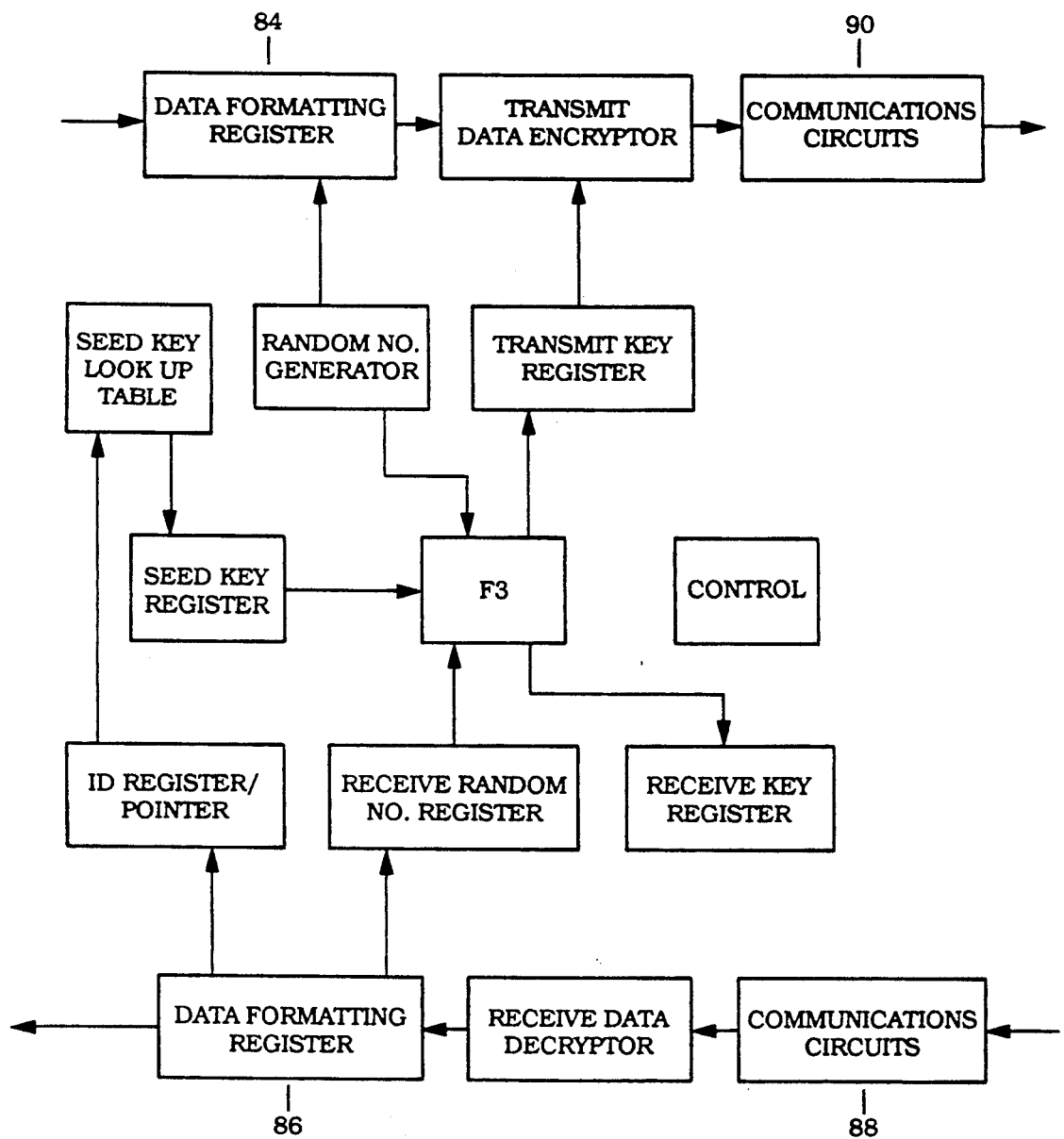

FIG. 11 Reader/central site encryption block/flow diagram.

HARDWARE DESCRIPTION

Descriptions of hardware and operation have been arbitrarily chosen to illustrate the concepts involved. Actual component and system appearances, layouts and operation may differ in the interest of functionality.

The equipment is owned or is the responsibility of several parties: the "owner" refers to the private individual to whom the operating card is sold or otherwise assigned; the merchant or vendor is referred to as the "merchant" and is the customer of the bank for both banking services, cash receipt cards and readers; the bank is generally the seller of the equipment, including owner cards, readers and services; the bank is the customer of the equipment manufacturer and operator of the host computer system; the credit card institution is a subscriber to services, customer of the equipment manufacturer (generally for initiation units only) and operates through its member banks; police, emergency medical providers and other government agencies are either direct subscribers or subscribe through the banks.

Figure 1A:
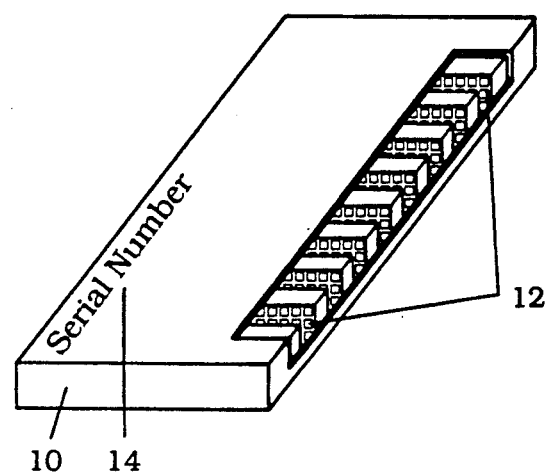
FIG. 1A Is a representation of the physical owner card.

The system is comprised of cards, card readers, initialization units, communications equipment and computer interfaces where required. These components and their function are described as follows:

1) The owner's card (OC) (FIG. 1) is of a convenient size and is comprised of a "trusted" (secure) single chip microprocessor with on board PROM, as is well known in the art, which contains the sensitive portions of the security software. This arrangement is further physically protected by being encased in plastic (10) and filled with epoxies who's solvents would physically damage microprocessor and memory components. A small EPROM memory and volatile RAM memory are also available to store session related constants and interium results. This circuitry controls security, access and organization of the card's main write once, read many memory. The write once, read many memory permanently retains time, date, location and transaction information for even small transactions.

Electrical connections to the reader for the present embodyment are via contacts (12) for power, control and data. The reader connection to the card (with onboard battery) could also be via radio, light wave, etc. Additionally, each card is serialized (14) for identification (as are all other components in the system). A secret mathematical derivative of the serial number is permanently stored in the card/component's memory and used as part of the identification process.

Figure 1B:
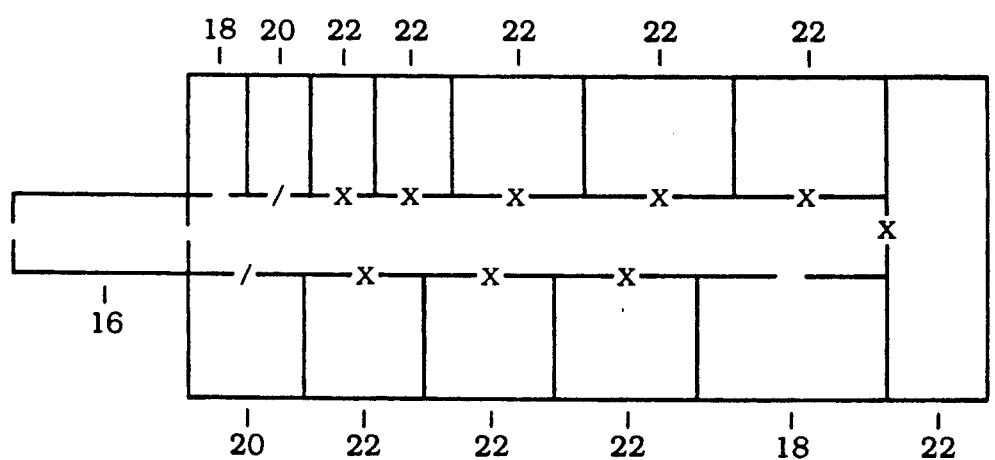
FIG. 1B Shows the account organization and depicts the security aspects. Certainly the software will be written to usememory space more efficiently than as shown.

The organization shown in FIG. 1B is like a hotel corridor which is protected by a security guard (16). Some of the rooms (18) are open and require only security guard permission (plugging into an authorized reader) to enter (emergency medical etc.), others (20) are closed and require the guard to open (entry of the owner's PIN), yet others (22) are locked and require the first two levels, but also require an additional key to open (the successful measurement of the owner's cadence of PIN entry).

2) The reader is a series of components which interface the card to the application. All readers "beep" after the transaction to remind the owner to take his card.

Figure 2:
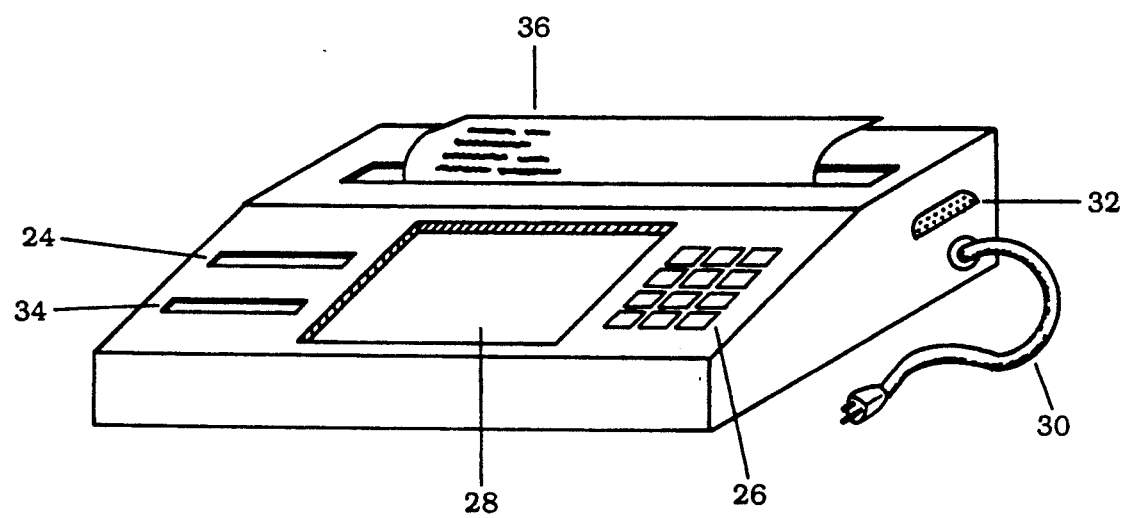
FIG. 2 Shows the owner's home reader.

A) Owner's Home Reader (OHR) (FIG. 2): is sold to the card owner and (after plugging his card in (24), and identifying himself to the combination on the key pad (26)) enables him to view on display (28), but not alter or write, in his various accounts with the exception of his cash accounts. He can move cash from one cash account to another, move cash into and from family member card's cash accounts and he can duplicate cards, except of course for cash accounts. (The new card must be initiated by his bank and/or other subscribers in order to be used on their system). The duplicate function reduces inconvenience in case the card is lost and avoids all his records being in the possession of others. Activation of his spare card automatically deactivates his original card.

The owner's home reader also has a power connection (30), telephone connection (modem or accoustic coupler) (32) which enables him to transact most of his business from home. The owner's home reader also provides a printer (36) to enable a "hard copy" of his past activities. The owner can also initialize family member cards on any or all of his various accounts by authenticating himself; plugging his card in (24), identifying himself on keypad (26), plugging the family member card in (34) and calling the various institutions to make arrangements to place their initilization unit on line.

Figure 3:
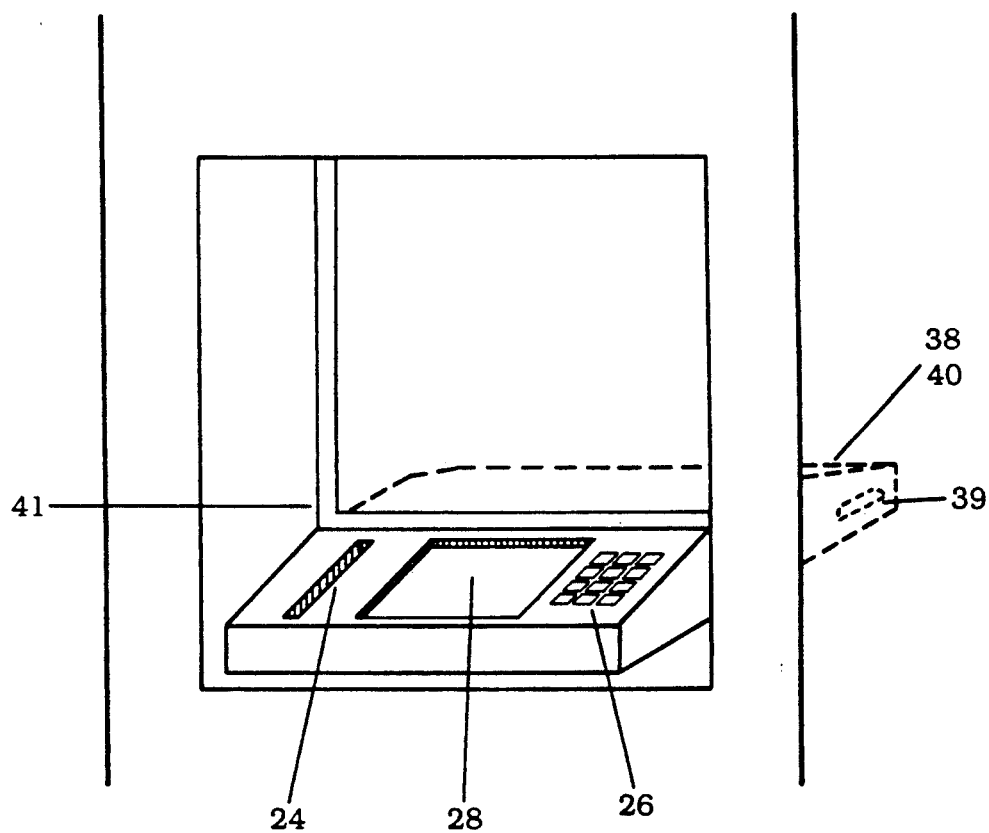
FIG. 3 Shows the reader intended for small businesses and vending machines.

B) Small Purchase Reader (SPR) (FIG. 3): intended for small businesses such as variety stores, vending machines, ticket sales machines/windows, etc. The SPR is initialized at time of purchase or after installation by having a bank employee personally visit the premises. The SPR is capable of displaying a menu (28) of services available, authenticating both OCs (24) and merchant' cards (38), but can access only the current transaction. A bezel is installed at position (41) for unattended operation.

Cash or charge purchases are made by transferring cash equivalent and/or account information from the owner's card into the vendor's cash receipts card. The cash receipts card is located in a protected area accessible only by the merchant and/or his cashier who cannot identify himself to the card/reader via keypad (40). The SPR connects to point of sale equipment, cash registers, vending machine electronics, etc. through port (39).

Figure 4:
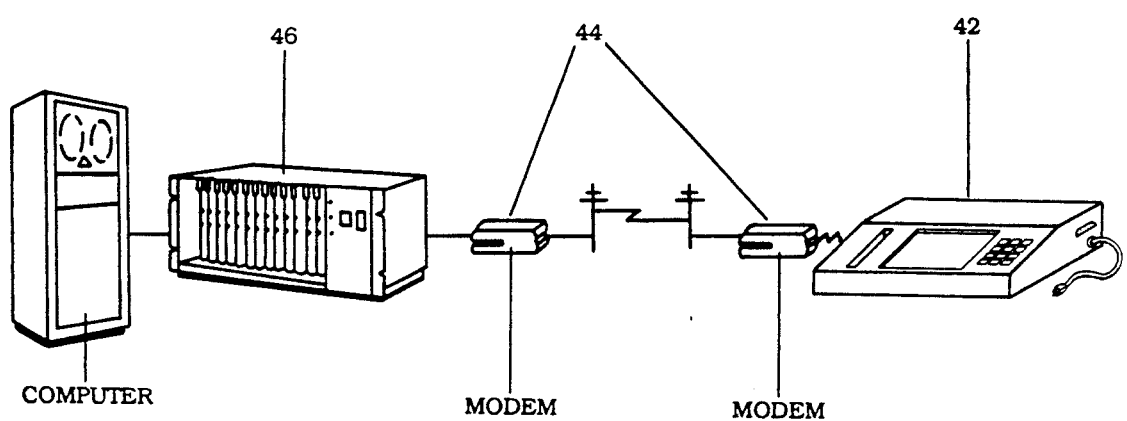
FIG. 4 Is the online reader.

C) On Line Reader (OLR) (FIG. 4 (42)): designed for use by larger stores, automatic teller machines, foreign currency exchange machines, investment accounts, etc. The OLR is initialized by a personal visit by the issuing bank's representative. The OLR is capable of displaying a menu of services available, authenticating OCs, reading and writing in the selected account under control of called computer and conducting an encrypted session with the called CSU (46). The OLR connects to point of sale equipment, cash registers, etc. through port 39.

D) Central Site Unit (CSU) (FIG. 4 (46)): this unit is the counterpart of the OLR and OHR. The CSU is either stand alone or rack mounted depending upon the number of communication lines (44) coming into the application at the bank or other institution. The unit is capable of conducting an encrypted conversation with the calling OLR and conducting a clear text session with the institution's host computer.

E) Restaurant Readers (RR): these resemble OLR's or SPR's for establishments where it is customary for the customer to go to the cashier for payment. An Interium Unit (IU) (FIGS. 5 & 6) is used to authenticate the owner at his table where price and gratuity are determined and authorized by the owner. Connection (48) enables the IU/owner card combination to connect to the RR. The card and IU are then taken to the cashier where the IU and card combination are plugged into the RR. The card is validated and the transaction finalized.

F) Police/Emergency medical readers (PEMR) (FIGS. 5 & 6): these are mechanically the same as the IU, but with different software. They provide automatic access to read license, registration, insurance, emergency medical records (not medical history), etc. These units cannot alter accounts except with the card owner's ID and permission.

G) Other applications: physical access readers, automobile ignition readers, automatic toll collection readers, telephone and TV access (children could be prevented from making long distance, 900 number calls or watching certain TV programs), pay per view TV, computer/terminal access, etc.

3) Initialization Units (FIG. 7): Initialization involves loading the card or reader with specific information regarding an institution's system. At a minimum it will include the system seed key (Customer ID provided by the equipment manufacturer and the second portion (extension) provided by the customer/institution), the institution's name address and phone number if any applications are on line. It should also include the types of accounts available and information formats for each type of account. Since initialization involves alpha and numeric information, Initialization Units are equipped with miniaturized full function keyboards (50). Two types of initialization units are available, each of which is provided with a card slot (24) for initializing owner and merchant cards, a keypad (26) for owner and merchant's initial PIN entries, an umbilical cord (52) connection for initializing the various types of readers and a communications connection (54) for online initializations.

A) Master Initialization Unit (MIU): The MIU is shipped from the factory serialized, programmed with the institution's customer ID installed and is shipped directly to a designated person or Data Security Officer (DSO). The DSO enters a pre-assigned password and other information as prompted by the MIU. The MIU is then used to program Working Initialization Units (WIU).

B) Working Initiation Units (WIU): WIU's are the same mechanically as MIU's, but with different programs installed.

The initialization process involves plugging the unit to be initialized into a WIU. The identification process is automatic using the special case encryption technique described later. The first initialization meets no question from the card being initialized. Future initializations will be questioned and the owner, who has already entered his PIN, must press the "enter" key again when prompted: INITIALIZATION ?. Readers too accept the first initialization without question. Subsequent initializations are done through the merchant's card port with the merchant's owner card plugged into the customer port for SPR's. OLR's receive subsequent initializations on line with the merchant's personal card plugged into the customer port and after the identification process takes place.

OPERATION

An on-line credit card purchase is described in detail as this type of transaction requires the full capability of the system. It also illustrates or reiterates the steps leading up to the ability to do the transaction.

Encryption is used in card/reader intercommunication to reduce the possibility of counterfeiting either the card or reader. Incentive to counterfeit is further reduced by implementation. There is simply no reward compared to the level of effect required. The card owner must have an established account with an institution in order to initialize his card, the established account will have limits assigned based on past performance and policies of the institution, duplication of a reader could only net a small amount of cash, $5K to $10K at most, and perhaps charge account information if the owner's PIN and cadence can also be duplicated.

PIN cadence is measured as an additional level of assurance to the card owner that his card can only be used by him. Thus, a pretender must: 1) be the type of person who would use a found card or who would steal a card, 2) have the card in his possession, 3) know or discover the owner's private PIN and 4) be able to duplicate the owner's cadence of PIN entry within a given number of tries.

Encryption of the on-line interchange is incorporated to protect the central site computer ports, assure that a pretender does not intercept a transfer of cash (small though they generally will be) and cannot eavesdrop on either the card owner's, nor the institution's, private business.

SCENARIO

The owner of a card, initialized on the Master Card account at XYZ Bank located at 545 Main Street, Hartford, Ct. 06511 wishes to make a multiple line item purchase on his Master Card at BIG Department Store, 234 5Th Ave. New York, NY 05105. BIG Department Store's Master Card account is with Some Other Bank, Any Street, New York, NY 05105.

The transaction as the owner and cashier experience it:

1) The owner takes his merchandise to the cashier.
2) Places his card in the customer reader.

| 3) Owner is presented with a menu: | 1 CASH |
|---|---|
| | 2 CHARGE |

4) Owner selects 2.

| 5) Owner is presented with a second menu: | 1 Master Card |
|---|---|
| | 2 VISA |
| | 3 ... |
| | 4 ... |
| | 5 BIG Store Card |

6) Owner selects 1.
7) Owner is prompted for his PIN
8) Owner enters PIN and ends by pressing the "enter" Key
9) Cashier rings up purchases on cash register which are also displayed on reader display, totals purchases, Tax, etc.
10) Owner confirms total by pressing enter key a second time.
11) After a few seconds reader displays TRANSACTION COMPLETE and beeps to alert owner to remove his card.
12) Owner removes card and reader goes back to blank display.

Equipment operation at each step with rational and comments:

1) No operation.
2) (FIG. 8)
   A) Power applied to card
   B) Card and reader exchange serial numbers (56)
   C) F1 (58) performed on received serial number (F1 is performed on each unit's own serial number (60) and permanently stored at time of manufacture).
   D) F1 results (unit's serial number derivative and received serial number derivative) under go F2 (62) (F2 hides serial number derivatives of F1 and the operation of both F1 and F2).
   E) F2 results are exchanged and compared (this operation is not considered secure, but establishes a first level of trust to enable the reader to provide menu information).
3) Reader now provides capabilities information: Cash? Charge?
4) Selection.
5) A listing of available charge methods.
6) Selection: (FIG. 9)
   A) Reader sends customer ID (portion of seed key programmed by manufacturer for Master Card) to owner's card.
   B) Owner's card (64) checks initialization list (66) of seed keys for ID. (since Master Card is a subscriber, it has its own seed key which is global and therefore used by all member banks to initialize their Master Card accounts). Since the owner's card is initialized for Master Card at XYZ Bank, the customer ID and therefore the seed key is found. The owner's card then loads the entire seed key into Seed Key Register (68) and sends a positive acknowledgement to the reader.
   C) Both card and reader generate a group of random characters (70).
   D) Random Character groups are exchanged (72).
   E) Both card and reader perform F3 (74) on the seed key (68), the locally generated random characters (70) and load the result into the transmit working encryption key registor (76).

F) Both card and reader perform F3 (74) on the seed key (68), the received random characters (72) and load the result into the receive working Decryption Key Register (78) (The card's transmit key should now be the same as the reader's receive key and vice versa).

G) Encryptors (80 & 82) are then activated and the units exchange positive acknowledgments to confirm working keys.

H) Owner's card sends owner verification information to reader.

7) Reader prompts for PIN.

8) Owner enters PIN terminated by depression of the "enter" key.

A) Reader checks PIN for accuracy.

B) Reader checks cadence (This can be done in many ways. The following should therefore be considered representative) (FIG. 10A). (It will be remembered that the time of a key depression (T1) is called a "mark" and the interval between the release of one key and the depression of the next key (T2) is called a "space". The "space" between release of the last number key and the enter key is used in the test, but the "mark" of the enter key itself is not used).

a) Each mark is tested against its counterpart of a moving average of a number of previously entered PIN's.

b) Each space is tested against its counterpart of a moving average of a number of previously entered PINs.

c) The total time of pin entry is tested against its counterpart of a moving average of a number of previously entered PINs.

d) The ratio of total mark time to total space time is tested against its counterpart of a moving average of a number of previously entered PINs.

NOTE: In my test (FIG. 10B), I used a strip chart recorder attached to a keypad and a battery to gather at least 10 samples from 10 individuals. Each person was given the same seven digit number to enter. This represents 10 card owners and nine attackers who have obtained his card and his PIN. The measurements I made on the length of marks and spaces can better be called estimates and the tests themselves were very rough as well. I simply took the average of each mark and space over the ten samples taken, set 125% as the upper limit, 75% as the lower limit then tested the individual entries against these limits. If more than four measurements (marks and/or spaces) fell outside the limits, that PIN entry failed. I tested each subject against his own data and tested his limits against the data taken from the other nine subjects. With no other test done (total time of PIN entry, mark space ratio, etc.), I found that the subject entering the samples passed his own test on 94% of his tries and that the samples taken from the nine other subjects failed 96% of the time when compared against the primary subjects upper and lower limits. This indicates that a card owner would need to re-enter his PIN six times in 100 uses and that a pretender would need to try about 25 times to be able to access the owner's card. Of course the number of tries would be limited to something like two to five and the card would be electrically marked to prevent continued attempts. The mark could be removed by an attended reader where the true owner could offer additional proof of identity.

It is obvious that if more and better measurements were taken over an extended period of time and that if more and better tests were designed (standard deviations rather than fixed percentages for the mark and space comparisons, etc.) much better results could be expected. The card would be more forgiving of the owner and less forgiving of the imposter.

Some caveats need to be taken: 1) mood swings have an effect on cadence. The moving average therefore needs to cover several days, 2) alcohol consumption and medication, most likely, have an effect on cadence. In the described card, I have included a petty cash account which, with proper planning, can serve in an emergency. The cadence portion of the authentication process can be waived for this account; certainly a person can remember his PIN in even such adverse conditions.

9) Purchases rung.

A) The reader accepts and holds the purchase information from the cash register's serial port.

10) Owner confirms total.

A) (session now established with merchants bank (the "central site"). This session is through, perhaps, the merchant's switching or multiplex equipment, telephone company, Time Net, Telenet, etc., thus special precautions are taken to protect the data (please see FIG. 11).

B) Initial identification and encryption is essentially the same as described for card to reader session with three exceptions: 1) since the merchant's reader was initialized by his Master Card Bank, all transactions will include the proper seed key, 2) a transmit and receive data formatting buffer has been added (84 & 86). The purpose of these buffers is to render break back more difficult. At the beginning I stated that it is bad policy to encrypt a constant and a variable under a known encryption algorithm. The encryption key is a variable for each session, however, a great deal of data may be repeated from session to session; the name of the institiution, type of transaction and the customer ID for instance. It is highly unlikely that the information gained would be of sufficient value to an eavesdropper to warrant the effort required to break the sessions back; he could only view the transactions and certainly not emulate the computer or the terminal. But, it is easy and inexpensive to make break back much more difficult thus the addition of the transmit and receive buffers, 3) since data communications will be serial and under various standards, thus communication circuits (88 & 90) have been added.

Transmissions can be "bursts" of data of fixed format, 80 characters for instance. If the data being transmitted is less than 80 characters, random fill characters can be used. These in turn can be loaded into a 132 character "packet" starting at a randomly selected character position.

A pointer block can be included to inform the receiving buffer where the data characters start and the number of characters in the string. Since the information in the pointer block is variable it can occupy a fixed position in the 132 character packet. The 132 character packet is then encrypted and sent over the network.

C) Bank's computer sends a positive acknowledge to reader as it receives each block as does the reader for each block received from the computer. The types of information involved are:
  a) The serial number of the owner's card, the name, address and perhaps other identifier of the bank where the owner's Master Card account is located, purchase information and amounts as Master Card policy dictates.
  b) Transfer of cash from the Bank's Master Card account into the merchant's checking account is perhaps automatic through the Bank's computer.
  c) Etc.
D) After the final positive acknowledgement is received from the Bank's computer, reader and central site equipment clear all security related buffers, central site equipment clears all transaction related buffers, reader loads the completed and confirmed transaction into the owner's card, including time/date BIG Store's name, city and state, puts up the "TRANSACTION COMPLETE" message, both card and reader clear all security and transaction related buffers and the reader beeps to alert the owner to take his card.

11) TRANSACTION COMPLETE and "beep"
12) Owner takes card and reader display goes to blank.

Operation in all other cases is similar with the exceptions being:

1) The restaurant interim unit handles the complete transaction up to the data transmission step (following step 10 above). This and subsequent steps are handled by the Restaurant Reader. The owner's card is then returned to him by the waiter.

2) Had the purchase been cash rather than charge in step 4 above, the reader would have taken cash options from the card for display. The owner is expected to know which account is protected and at what level. He makes his selection and the encryption "hand shake" takes place. In this instance the card's response to 6A is a negative acknowledge since the owner has no cash account with the Merchant's Bank. In this case two sets of random numbers are generated by the card and by the reader. The second set is used in conjunction with the results of step 2d to under go F2 a second time and the result is used in place of the seed key in steps 6E and 6F. The remainder of the transaction is as before.

It should be noted that the card must always be initialized and therefore contain a seed key for a charge or withdrawal transaction. This protects both the owner and the credit card company. For a cash disbursements transaction however, the seed key may not be available. The mathematical functions (F1, F2, and F3) themselves however, provide a very strong level of security.

3) Cash or charge purchases from the owner's home reader are handled in the same manner. The owner must identify himself to the card/reader combination, then the owner's home reader must identify itself to the called unit. Account withdrawals and charges must, of course, always be from established and initialized accounts. Cash disbursements can use the dual random number technique.

4) Initializations use the dual random number technique.

5) The case of a small business or vending machine reader is the same except that the information is loaded into the various accounts of the merchants collections/deposits only card. This card is then off-loaded into either the merchant's cash or charge accounts at his bank or banks.

While the above describes a workable consumer oriented secure "smart card" system, it is only one of many possible variations and/or embodiments. The scope of the invention should therefore be as defined in the following claims:

I claim:

1. A method of authenticating a person's identity who claims authority to use a device as a part of a closed system comprising the steps of:
  A. Having said person enter an identification code on a plurality of electric switches and
  B. Measuring the amount of time each individual switch is activated and
  C. Measuring the amount of time between deactivation of each switch and activation of the following switch
  D. Measuring the cadence of code entry and,
  E. Comparing said measurements to counterpart measurements taken on previous code entries made by the known authorized person to determine if a predetermined positive correlation exists to authenticate the claiming person.

2. A method of authenticating the user of a rotary combination lock comprising:
  A. tumbler switches which measures the time the combination dial is at rest at each tumbler position and the amount of time required to move said dial from one rest position to the next rest position and
  B. a means to make and compare said measurements as described in claim 1.

3. A method of authenticating the user of a push button combination lock comprising:
  A. A set of push switches which measures the time of activation of each switch and the time between deactivation of one switch and activation of the next switch and
  B. A means to make and compare said measurements as described in claim 1.

4. A method of authenticating the user of a computer terminal comprising:
  A. A set of push switches chosen from a group of sets of push switches comprised of the terminal's own keyboard means and a seperately provided keyboard means which measures the time of switch activation and the time between deactivation of one switch and activation of the next switch and
  B. A means to make and compare said measurements as described in claim 1.

5. A method according to claim 1, further including a portable memory device segmented into portions which are individually accessable only by use of the proper combination of secret constant, random bits, relational means, encryption means, code entry and cadence of code entry.

6. A system comprising
  A. A portable memory device as described in claim 5 and
  B. A means for accessing and reading/writing said portable memory device and
  C. A means for communicating with auxiliary equipment.

7. A method according to claim 1 further including automatically generating secret encryption keys among the various members of a group of equipment operating as a closed secure system and excluding nonmembers fro listening or participating in intergroup communication comprising:
  A: Selecting at least one secret constant from the groups of alpha characters, numeric characters and control characters and
  B: Loading a memory means with said constant and an encryption process and
  C: Randomly generating a group of binary bit which are transmitted from one group member and received by at least one other group member and
  D: Combining by means of said encryption process said constant and said random binary bits to generate an encryption key at both the transmitting group member and the receiving group member.

8. A method according to claim 7 further including a series of devices which permits two or more entities to influence the generating of said encryption key to the exclusion of other combination of related entities comprising:
  A: Segmenting said constant into a plurality of predetermined portions to permit each entity to contribute a predetermined portion of said constant and
  B: Loading said predetermined portions into said memory means.

* * * * *